Figure 1:
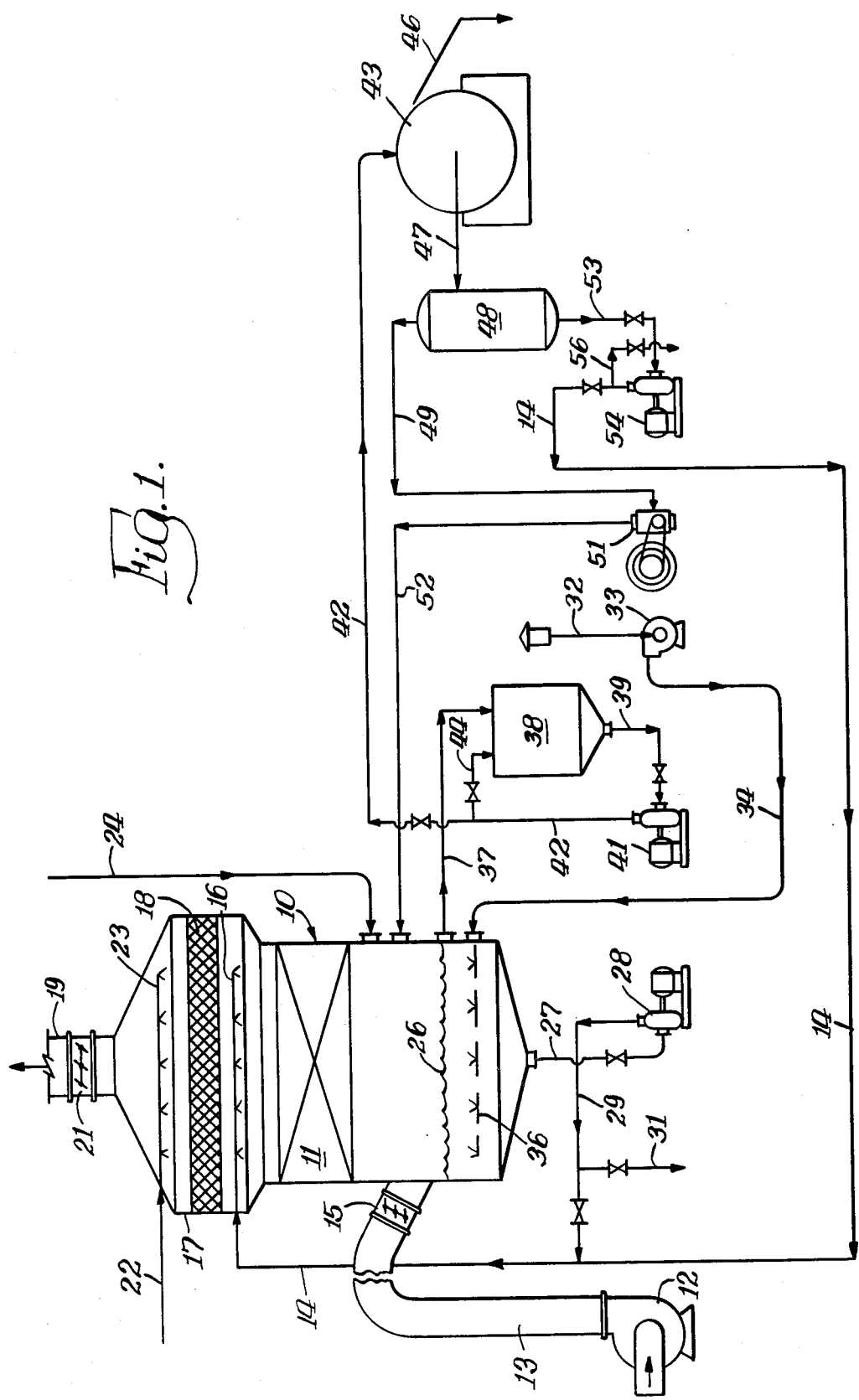

United States Patent [19]

Thompson

[11] 4,218,342

[45] Aug. 19, 1980

[54] COMPOSITION FOR CATALYTIC REMOVAL OF HYDROGEN SULFIDE FROM GASES

[75] Inventor: Ralph B. Thompson, Oak Brook, Ill.

[73] Assignee: Air Resources, Inc., Palatine, Ill.

[21] Appl. No.: 54,171

[22] Filed: Jul. 2, 1979

Related U.S. Application Data

[60] Division of Ser. No. 815,788, Jul. 14, 1977, which is a continuation-in-part of Ser. No. 728,855, Oct. 1, 1976, abandoned, which is a continuation of Ser. No. 551,279, Feb. 20, 1975, abandoned.

[51] Int. Cl.$^2$ .............................................. B01J 31/22
[52] U.S. Cl. ........................... 252/431 C; 252/431 N
[58] Field of Search ...................... 252/431 C, 431 N; 423/224, 226, 228, 571, 573, 573.6

[56] References Cited

U.S. PATENT DOCUMENTS

| | | | |
|---|---|---|---|
| 3,068,065 | 12/1962 | Hartley et al. | 423/228 |
| 3,496,074 | 2/1970 | Welling | 204/48 |
| 3,666,446 | 5/1972 | Cook et al. | 75/101 |

FOREIGN PATENT DOCUMENTS 999799  7/1965  United Kingdom ................ 423/573 L

*Primary Examiner*—Patrick Garvin
*Attorney, Agent, or Firm*—Merriam, Marshall & Bicknell

[57] ABSTRACT

A composition for use in an oxidation-reduction process for effecting the catalytic oxidation of hydrogen sulfide gas comprising a water soluble ferric iron salt and at least two iron chelating agents, preferably as an alkaline aqueous chelated iron solution, with at least one of said iron chelating agents being an amine compound selected from the group consisting of polyamino polycarboxylic acids, polyamino alkyl polycarboxylic acids, polyamino hydroxyalkyl polycarboxylic acids, and poly(phosphonoalkyl) amines, and their alkali metal salts, such as the sodium salt of ethylenediamine tetraacetic acid, and another of said iron chelating agents being selected from the group of polyhydroxy compounds consisting of monosaccharides, disaccharides, reduced monosaccharides, reduced disaccharides, monosaccharide acids, disaccharide acids, and their alkali metal salts, such as sorbitol. An alkaline aqueous chelated iron solution is prepared by dissolving a water soluble ferric iron salt in water, adding to the solution the required amine-type and polyhydroxy-type iron chelating agents, and to this solution is added an alkaline material, such as sodium hydroxide or sodium carbonate, to provide a concentrate which can be diluted with water as required to obtain an operating solution having the desired pH and iron content for a selected process.

14 Claims, 2 Drawing Figures

COMPOSITION FOR CATALYTIC REMOVAL OF HYDROGEN SULFIDE FROM GASES

This application is a divisional application of U.S. application Ser. No. 815,788, filed July 14, 1977, which was a continuation-in-part of U.S. application Ser. No. 728,855, filed Oct. 1, 1976, now abandoned, which was a continuation application of U.S. application Ser. No. 551,279, filed Feb. 20, 1975, now abandoned.

This invention relates to improvements in the removal of hydrogen sulfide gas from a gaseous fluid stream by a continuous catalytic oxidation-reduction system utilizing ferric iron chelate to catalytically oxidize the hydrogen sulfide and recover elemental sulfur.

In a catalytic oxidation-reduction process for removing hydrogen sulfide from a fluid stream using an iron chelate catalyst, the ferric iron chelate is reduced to the ferrous state and the ferrous ions formed are continuously oxidized by contacting with oxygen to continuously regenerate the ferric iron chelate catalyst. The series of reactions involved in catalytically oxidizing hydrogen sulfide to elemental sulfur using an iron chelate catalytic reagent can be represented by the following equations:

$$H_2S(Gas) + H_2O(Liquid) \rightleftharpoons H_2S(Aqueous) + H_2O(Liquid) \quad (1)$$

$$H_2S(Aqueous) \rightleftharpoons H^+ + HS^- \quad (2)$$

$$HS^- \rightleftharpoons H^+ + S^= \quad (3)$$

$$S^= + 2(Fe.Chelate)^{+3} \rightarrow S°(Solid) + 2(Fe.Chelate)^{+2} \quad (4)$$

By combining equations (1) through (4) the resulting equation is:

$$H_2S(gas) + 2(Fe.Chelate)^{+3} \rightleftharpoons 2H^+ + 2(Fe.Chelate)^{+2} + S° \quad (5)$$

In order to have an economical workable process for removing hydrogen sulfide from a gaseous feed stream when a ferric iron chelate is used to effect catalytic oxidation of the hydrogen sulfide, it is essential that the ferrous iron chelate formed in the above described manner be continuously regenerated by oxidizing to ferric iron chelate on contacting the reaction solution with dissolved oxygen, preferably in the form of ambient air, in the same or in a separate reaction zone. The series of reactions which take place when regenerating the required ferric iron chelate can be represented by the following equations:

$$O_2(gas) + 2H_2O \rightleftharpoons O_2(aqueous) + 2H_2O \quad (6)$$

$$O_2(aqueous) + 2H_2O + 4(Fe.Chelate)^{+2} \rightleftharpoons 4(OH)^- + 4(Fe.Chelate)^{+3} \quad (7),$$

or $$\tfrac{1}{2}O_2 + H_2O + 2(Fe.Chelate)^{+2} \rightleftharpoons 2(OH)^-) + 2(Fe.Chelate)^{+3} \quad (8)$$

By combining equations (6) through (8), the resulting equation is:

$$\tfrac{1}{2}O_2(gas) + H_2O + 2(Fe.Chelate)^{+2} \rightleftharpoons 2(OH)^- + 2(Fe.Chelate)^{+3} \quad (9)$$

And, when equations (5) and (9) are combined, the overall process can be represented by the following equation:

$$H_2S(gas) + \tfrac{1}{2}O_2(gas) \rightarrow S°(solid) + H_2O(Liquid) \quad (10)$$

As gaseous hydrogen sulfide has a low solubility in an acidic aqueous solution, the catalytic oxidation of the hydrogen sulfide is preferably carried out in an aqueous alkaline solution, because hydrogen sulfide gas is absorbed more rapidly and sulfide ions produced at a significantly increased rate when the reaction solution has a higher pH value. When the continuous catalytic oxidation-reduction reaction solution is maintained at the higher pH values and a conventional chelating agent used, an insoluble precipitate of ferric hydroxide is formed which removes iron from the reaction solution and reduces the concentration of catalytic reagent. The precipitation of ferrous sulfide is likewise highly detrimental, as this also reduces the concentration of the catalytic reagent in the reaction solution. It is therefore desirable to eliminate or minimize the loss of iron from the reaction solution, particularly at the higher pH values, in order to provide a practical process for removing hydrogen sulfide from a stream of industrial process gas.

It has been found that not all iron chelating agents capable of forming a complex in aqueous solutions with iron in the ferric valence state ($Fe^{+3}$) or in the ferrous valence state ($Fe^{+2}$) are suitable for use over the broad pH range required as an effective catalyst in the oxidation-reduction system for the removal of hydrogen sulfide from a fluid stream. Nor are all the chelating agents which permit oxidizing iron from the ferrous to the ferric valence state suitable for forming the catalytic reagent in a continuous catalytic oxidation-reduction system for the removal of hydrogen sulfide from a gaseous or fluid steam.

Among the iron chelate reagents which have been used in a process for removing hydrogen sulfide are the polyaminopolyacid chelates, particularly the polyaminopolyacetic acid-type chelating agents, such as ethylenediamine tetra-acetic acid (hereinafter referred to as EDTA) and the alkali metal salts thereof. However, these polyaminopolyacid chelating agents have not been satisfactory, because they do not operate efficiently at the high pH levels required to obtain good absorption of hydrogen sulfide and permit loss of iron as a precipitate of ferric hydroxide and/or ferrous sulfide from the reaction solution, as disclosed in British Pat. No. 999,799. Furthermore, during the operation of the process it is generally necessary to make additions of alkaline material, such as sodium carbonate, to the system to maintain the operating solution at the desired high pH. In a commercial unit this necessarily means that there will be temporary localized high concentration of alkali, and a pH will be reached locally within the operating solution which is in excess of the pH level at which EDTA alone is effective. As a result, iron is precipitated.

It has been suggested that the loss of iron caused by the formation of insoluble sulfide and hydroxide precipitates could be avoided by using an organic base, such as triethanolamine (TEA), in combination with a polyaminopolyacid chelating agent to control the pH of the reaction solution. However, when an organic base, such as triethanolamine, is added to a concentrated EDTA chelated iron solution of the type required for economical transport, storage and make-up in a practical commercial operation, the resulting solution is unstable and forms a precipitate. Also, the addition of an organic base such as triethanolamine to a catalytic oxidation-reduction EDTA-iron solution having a comparatively high pH and containing carbon dioxide which is often present in an amount up to 15% by volume or more along with the hydrogen sulfide in a feed stream is undesirable, because of the side reactions which take place between such bases and carbon dioxide (See British Pat. No. 999,799).

Accordingly, a primary object of the present invention is to provide a novel and improved catalytic oxidation-reduction system for removing hydrogen sulfide from fluid streams which avoids the difficulties encountered in the prior art systems of this type.

It is also an object of the present invention to provide an improved catalytic reagent and continuous catalytic oxidation-reduction process effecting the continuous removal of hydrogen sulfide from a gaseous stream without causing loss of catalyst while operating the process over a wide range of pH values.

It is a further object of the present invention to provide an improved catalytic iron chelate reagent and a continuous catalytic oxidation-reduction process for removing hydrogen sulfide gas from a fluid stream by oxidizing the hydrogen sulfide to elemental sulfur wherein any iron sulfide formed due to the reaction solution having too high a concentration of ferrous ion (i.e. over-reduction) can be regenerated without causing permanent loss of iron from the reaction solution.

Figure 2:
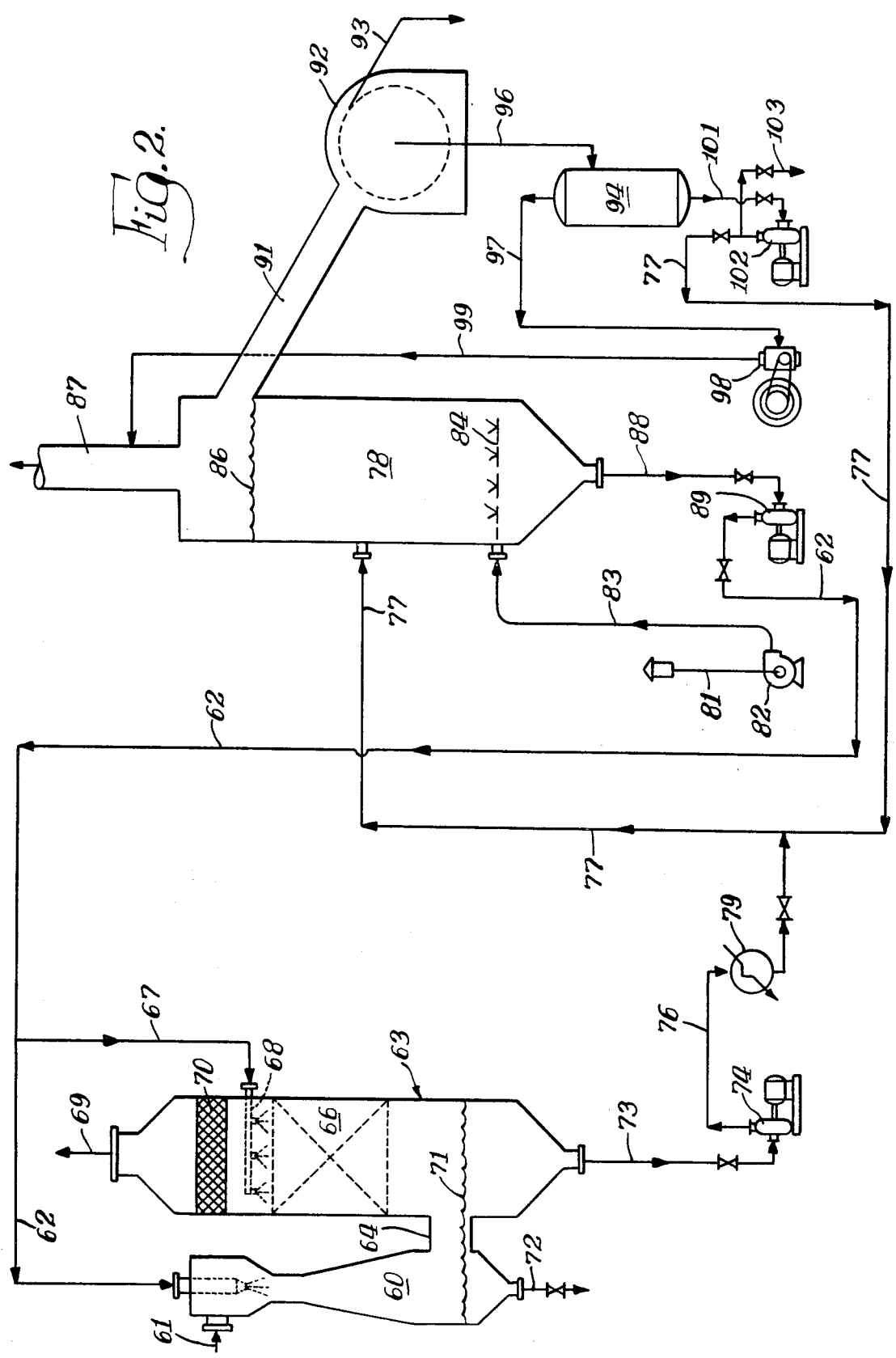

Other objects and advantages of the invention will become apparent from the subsequent detailed description in conjunction with the accompanying drawings, wherein:

FIG. 1 is a schematic process flow diagram showing one method of practicing the invention wherein oxidation of hydrogen sulfide and regeneration of the solution are carried out in the same reaction vessel; and FIG. 2 is a schematic process flow diagram showing an alternate method of practicing the invention wherein regeneration of the solution is effected in a separate reaction vessel.

The foregoing objects can be achieved by using as the catalytic chelating reagent in a catalytic oxidation-reduction system for oxidizing hydrogen sulfide ($H_2S$) in an aqueous solution at a pH between about pH 5.5 and 13, and preferably in an alkaline aqueous reaction solution at a pH between 8 and 10.5, a novel combination of two different catalytic chelating agents herein designated for convenience as Type A chelating agent and Type B chelating agent, respectively. The combination of the Type A and Type B chelating agents effectively prevents the irreversible precipitation of the iron hydroxide or sulfide and reduces the formation of objectionable side reaction products while providing the catalytic oxidation-reduction action required for continuously removing hydrogen sulfide from a fluid stream. Thus, a catalytic oxidation-reduction system containing the mixture of Type A and Type B chelating agents has the ability to tolerate over-reduction of the solution so that the reaction solution can be re-oxidized and any ferrous sulfide redissolved over a wide pH range. Also, when the reaction solution is over-oxidized (i.e. too high a concentration of ferric ion formed), any ferric hydroxide present can be redissolved over a wide range of pH values; thereby avoiding permanent loss of iron from the reaction solution.

The Type A chelating agents which can be used in the present invention are a class of amines which include the polyamino polycarboxylic acids, polyaminoalkyl polycarboxylic acids, polyaminohydroxyalkyl polycarboxylic acids, and polyphosphonoalkyl amines, such as the polyphosphonomethyl amines, the latter being phosphorus analogs of the polyamino polycarboxylic acids. Usually the aforementioned types of chelating agents, either singly or as a mixture, will be used in the form of their alkali metal salts, particularly the sodium salts. The polyamino polyacetic acids and the polyamino hydroxyethyl polyacetic acids, or their sodium salts, are particularly desirable. The Type A chelating agent, in addition to forming ferric iron chelate, complexes with ferrous ions to form the complex $Fe \cdot Chel_A{}^{+2}$. However, the molar ratio of Type A chelating reagent to iron which is required to hold the iron in solution, when EDTA is used as the iron chelating agent, becomes large when the pH is high and the concentration of ferric ion is high. But, when the molar ratio of Type A chelating agent, such as EDTA, to iron is above a 1:1 molar ratio, en excessive loss of EDTA chelating agent occurs due to a more rapid breakdown of the EDTA molecule, and the required amount of EDTA cannot be economically used under such conditions. In the present invention the Type A chelating agent, such as EDTA, can be used in an amount below the 1:1 molar ratio while the concentration of uncombined ferrous ions in the reaction solution is maintained below the solubility product constant for ferrous sulfide (i.e. no ferrous sulfide is precipitated). Also, since a high molar ratio of Type A chelating agent to iron prevents oxidation of the ferrous iron chelate to ferric iron chelate, the concentration of Type A chelating agent is kept sufficiently low that the $Fe^{+2}$ ion present can be readily oxidized to the $Fe^{+3}$ valence form by the quantity of atmospheric oxygen which can be brought into contact with the reaction solution under the operating conditions of a continuous catalytic process.

As the Type B chelating agent, the invention uses a polyhydroxy chelating agent, such as the sugars, the sugar acids or the reduced sugars, including both monosaccharides and polysaccharides. Examples of suitable polysaccharide sugars are the disaccharides, such as sucrose, lactose, and maltose, and examples of the monosaccharides are glucose and fructose. Suitable sugar acids include the disaccharide sugar acids and monosaccharide sugar acids, such as gluconic acid and glucoheptanoic acid, which may be used in the form of their alkali metal salts particularly sodium salts. However, the reduced sugars are preferred for the Type B chelating agent, since there is no possibility of hydrolysis or oxidation at a potential aldehyde group. Examples of suitable reduced sugars are the reduced monosaccharides and reduced disaccharides, including sorbitol and mannitol.

The Type B chelating agents are neutral materials and are entirely ineffective for controlling the pH of the reaction solution. The Type B chelating agents are, however, particularly effective in avoiding the formation and precipitation of insoluble iron compositions by complexing with the ferric ions in the reaction solution. Thus, the Type B chelating agent readily complexes with ferric ions in solution to form the $(Fe \cdot Chel_B)^{+3}$ complex and binds ferric ions sufficiently strongly in highly alkaline solution to maintain the $Fe^{+3}$ ion concentration below the solubility product constant for ferric hydroxide. Furthermore, the addition of a Type B chelating material of the present invention to a catalytic chelating solution containing a Type A chelating material permits formulation of practical working solutions without the large excesses of EDTA normally required to avoid Fe(OH)$_3$ precipitation at high pH values. In fact, considerably less than the theoretical amount of Type A chelating agent can be used in a practical working solution for the practice of the process when a Type B chelating agent is used therewith, provided the solution is not completely oxidized or completely reduced. The (Fe.Chel$_B$)$^{+3}$ complex readily reacts with sulfide ions to effect oxidation thereof to elemental sulfur, as shown in Equation (4). It has been demonstrated that several Type B chelating agents, particularly sorbitol, have affinity only for trivalent ions so that the reaction of (Fe.Chel$_B$)$^{+3}$ necessarily results in the decomposition of the complex to form (Fe.Chel$_A$)$^{+2}$. The Type B chelating agents are capable of complexing with ferric ions in the reaction solution without interfering with either the oxidation or the reduction of the iron so that as much Type B chelating agent can be used as required to prevent precipitation of insoluble iron without interfering with the catalytic oxidation-reduction system. It has been found, however, that when a Type B chelating agent, such as sorbitol, is used as the only catalytic chelating agent in a catalytic oxidation-reduction system for removing hydrogen sulfide, an irreversible insoluble ferrous sulfide precipitate is formed in the reaction solution. Other types of chelating agents, such as the "Seqlene" glucoheptonates (products of Pfanstiehl Laboratories, Waukegan, Ill.), which normally form a more stable complex with both ferric and ferrous iron than a polyamino polycarboxylic chelating agent, such as EDTA, when used as the only chelating agent in a hydrogen sulfide catalytic oxidation-reduction system also allow ferrous sulfide to be precipitated from the reaction solution.

As described in more detail in the specific examples below, excellent results have been obtained using a mixture of the sodium salts of ethylene diamine tetraacetic acid (EDTA) and N-hydroxyethyl ethylene diamine triacetic acid (HEDTA) as the Type A catalytic chelating agent in combination with sorbitol as the Type B catalytic chelating agent. Aqueous solutions of the aforementioned Type A chelating agents are available commercially from the Dow Chemical Co. under the trademarks "Versene 100" (Na$_4$EDTA) and "Versenol 120" (Na$_3$HEDTA). The use of the foregoing mixture of Type A chelating agents is particularly advantageous, since such a mixture is more effective for chelating iron at the higher pH levels.

The chelated iron solution of the present invention is prepared by dissolving a suitable iron salt in water and adding the required amounts of the Type A and Type B chelating agents. To this solution the alkaline material is then added to provide a concentrate which can be diluted with water as required to obtain the operating solution having the desired pH and iron content. The iron content of the solution can vary over a wide range, dependent upon the gas being treated and other factors. Solutions having an iron content of from about 5 ppm to about 5000 ppm can be used, with 200 ppm to 2000 ppm being preferred. It has been observed that when iron is used in high concentration (i.e. above 5000 ppm), objectionably high losses of Type A chelating agent, such as EDTA, occur. In preparing the concentrate it is desirable always to add both chelating agents before the alkaline agent so as to avoid precipitation of iron. However, the presence of the two types of chelating agents improves the stability of the solution so that no great care is required in making up the final solution to prevent precipitation of iron.

For most efficient and economical operation, the amounts of the respective chelating agents should be no greater than required to complex the amount of iron present in either valence state. The molar ratio of Type A chelating agent to iron should not be greater than 2:1 and preferably within a range from about 0.5:1 to about 1.5:1 with the molar ratio of Type A chelating agent to iron of 0.8:1 being most preferred. It has also been observed that when the molar ratio of Type A chelating agent to iron does not exceed 1:1, a Type A chelating agent, such as EDTA, is more resistant to breakdown of the chelate molecules. The molar ratio of Type B chelating agent to iron should be a minimum of 1:6 (i.e. 0.167:1) with the preferred molar ratio being 0.8:1. As a Type B chelating agent does not effect any change in pH or interfere with either the oxidation or reduction of the system, there is no upper limit for the concentration of the Type B chelating agent from an operational standpoint. It will be evident from the foregoing that the molar ratio of Type B chelating agent to Type A chelating agent can be about 1:3, but a higher molar ratio of 1:1 is preferred. The iron salt is preferably a ferric salt, such as ferric chloride, ferric sulfate, or ferric nitrate. However, it is also possible to use a ferrous salt such as ferrous sulfate, but in this case the solution must be aerated prior to use in order to insure oxidation of the chelated iron to the ferric state. The alkaline material is preferably sodium carbonate or sodium hydroxide or mixtures thereof, although other alkaline compounds which do not adversely effect the reaction solution can be used.

The process flow for the catalytix oxidation-reduction system using the chelated iron solution of the present invention will depend upon the hydrogen sulfide content of the gas stream being treated and the nature of the other components of the gas stream. FIG. 1 illustrates a process flow in which the oxidation of hydrogen sulfide and the regeneration of the chelated iron solution are carried out concurrently in the same reaction vessel, this arrangement being referred to herein as aerobic absorption processing or aerobic operation. The process flow of FIG. 1 is particularly adapted for use in treating a waste gas stream containing a relatively low concentration of hydrogen sulfide (e.g. 500 ppm or less) and which has a relatively high concentration of oxygen (e.g. 20% by vol.), such as contaminated ventilating air, the off-gas from a xanthate plant producing rayon or cellophane, or gas from a sewage plant.

Referring to FIG. 1, the catalytic oxidation-reduction reaction system comprises an absorption tower or scrubber 10 containing a central contact zone illustrated schematically at 11. This zone may be a simple spray chamber or may comprise any suitable liquid-vapor contacting means such as the conventional packed beds, plates or trays. The inlet gas containing hydrogen sulfide is introduced into the tower 10 through a blower 12 and a conduit 13 below the contact zone 11 for passage upwardly therethrough. A flow control damper 15 is provided in the conduit 13. The chelated iron solution of the present invention is supplied by a line 14 to sprays or distribution nozzles 16 located in an enlarged upper section 17 of the tower 10 and passes downwardly through the contact zone 11 in countercurrent relation to the upwardly flowing gas stream. The treated gas exits from the tower 10 through a demister zone 18 in the section 17 and an outlet 19 having a flow control damper 21. Make-up water may be added to the system, as required, through a line 22 communicating with sprays 23 located above the demister zone 18. In the alternate, the water used to wash the sulfur filter cake can be returned to the system as make-up water. Make-up chelated iron solution may be added, as required, through a line 24 communicating with the tower 10 below the contact zone 11.

In the arrangement illustrated in FIG. 1 the bottom portion of the absorption tower 10 is used as a reservoir for the chelated iron solution which fills the bottom of the tower to a level, indicated at 26, below the point of introduction of gas through the conduit 13. The chelated iron solution is continuously recirculated from the bottom of the tower 10 to the nozzles 16 through a line 27, a pump 28, and a line 29 connected to the line 14. A portion of the chelated iron solution may be bled from the system through a line 31, as may be required.

When treating gases having a low concentration of hydrogen sulfide and where the gas stream contains a relatively high concentration of oxygen, it is not necessary to introduce an additional oxygen containing gas stream into the tower 10 to effect regeneration of the solution, but when treating gases containing more than about 100 ppm hydrogen sulfide, regeneration of the chelated iron solution is effected by drawing atmospheric air through a screened inlet 32 by a blower 33, and the air is supplied through a line 34 to nozzles 36 disposed in the lower portion of the tower 10 so that the air is bubbled through the volume of solution in the bottom of the tower 10, thereby thoroughly aerating the solution and oxidizing the ferrous iron to ferric iron. The effluent air passes upwardly through the tower 10 along with the feed gas and exits with the treated gas through the outlet 19.

In the contact zone 11 the hydrogen sulfide in the inlet gas is oxidized to elemental sulfur by the chelated iron solution, as heretofore described. The sulfur solids formed are present as a slurry in the treating solution in the bottom of the tower. A portion of this slurry, is continuously withdrawn from the tower 10 through a line 37 to a slurry tank 38. The sulfur slurry is withdrawn from the bottom of the slurry tank through a line 39 by a pump 41 and is supplied through a line 42 to a filtration step, in this case a continuous drum filter 43. A portion of the sulfur slurry may be recirculated to the tank 38 through a line 44.

Wet sulfur product is recovered from the drum filter 43 through a line 46 and may be washed with make-up water (not shown), to the extent that the water balance of the system permits, in order to recover chelated iron. If desired, the wet sulfur product may be dried to an autoclave (not shown) to obtain a dry high purity sulfur product. The filtrate is withdrawn from the drum filter 43 through a line 47 to a receiver 48. Vapor or gas is removed from the top of the receiver 48 through a line 49 by a vacuum pump 51 and is introduced by a line 52 to the absorption tower 10 below the contact zone 11. Liquid filtrate is withdrawn from the bottom of the receiver 48 through a line 53 by a pump 54 and is recirculated through line 14 to the absorption tower 10. A portion of the filtrate may be bled from the system through a line 56, as desired.

FIG. 2 illustrates a process flow, in accordance with the invention, which is particularly adapted for the treatment of gas streams containing hydrocarbons or other oxygen-free gases, e.g. a sour natural gas. In this system the removal of hydrogen sulfide and the regeneration of the chelated iron solution are carried out in separate reaction zones, this arrangement being referred to as anaerobic absorption processing or anaerobic operation.

Referring to FIG. 2, a venturi scrubber 60 is utilized for primary contact in order to accommodate the high hydrogen sulfide concentration in the feed gas. The gas is introduced to the scrubber through a line 61, and a portion of the chelated iron solution is introduced to the scrubber 60 through a line 62. The lower portion of the scrubber 60 communicates with the lower portion of an absorption tower 63 by means of an enlarged conduit 64. The gas flows from the scrubber 60 and passes upwardly through a contact zone 66 in countercurrent relation with a downwardly flowing portion of the chelated iron solution supplied from line 62 and a line 67 to nozzles or sprays 68 disposed above the contact zone 66. The treated gas exits from the top of the tower 63 through a line 69 after passing through a demister zone 70.

Chelated iron solution accumulates in the bottom portions of the scrubber 60 and the tower 63, as indicated by the liquid level 71. A portion of the solution may be bled from the bottom of the scrubber 60 through a line 72, as desired. The solution accumulating in the bottom of the tower 63 is withdrawn through a line 73 by a pump 74 and is discharged through lines 76 and 77 into an oxidizer or regeneration vessel 78. If necessary, a heat exchanger or cooler 79 may be interposed in the line 76. In the vessel 78 the chelated iron solution is oxidized or regenerated by introduction of atmospheric air drawn through a screened inlet 81 by a blower 82 and supplied by a line 83 to nozzles 84 located in the lower portion of the vessel 78 below the liquid level indicated at 86. The air bubbles through and aerates the solution, as previously described, and exits from the vessel 78 through a conduit 87. The regenerated solution is continuously withdrawn from the bottom of the vessel 78 through a line 88 by a pump 89 and is recirculated through lines 62 and 67 to the scrubber 60 and the tower 63.

The sulfur slurry is continuously withdrawn from the vessel 78 through a conduit 91 to a drum filter 92, as previously described in connection with FIG. 1. Wet sulfur product is removed at a line 93, and filtrate is passed to a receiver 94 through a line 96. Vapor or gas is withdrawn from the receiver 94 through a line 97 by a vacuum pump 98 and is vented through a line 99 into the air exit conduit 87 of the vessel 78. Filtrate is withdrawn from the bottom of the receiver 94 through a line 101 and is recirculated by a pump 102 through line 77 to the regeneration vessel 78, a portion of the filtrate being bled from the system through a line 103, is desired.

In either the FIG. 1 or the FIG. 2 process flow arrangements the operating temperature and pressure are not critical and may vary over a wide range. Practically speaking, however, the process will normally be operated at ambient or room temperature and at atmospheric pressure or slightly above.

The following examples will serve to illustrate the invention but are not to be construed as limiting the invention:

EXAMPLE 1

A chelated iron concentrate was prepared using a concentrated aqueous solution of Na₄EDTA (Versene 100) and a concentrated aqueous solution of Na₃-HEDTA (Versenol 120) as the Type A chelating agents and using sorbitol as the Type B chelating agent. The composition of the concentrate was as follows on a weight percent basis:

| | |
|---|---|
| Water | 55.9% |
| FeCl$_3$ (39 wt. % aqueous solution) | 13.4 |
| Versene Powder (Na$_4$EDTA) | 6.3 |
| Versenol 120 (41 wt. % aqueous solution Na$_3$HEDTA) | 6.3 |
| Sorbitol (70 wt. % aqueous solution) | 6.3 |
| NaOH (50 wt. % aqueous solution) | 3.6 |
| Na$_2$CO$_3$ | 8.2 |
| | 100.0% |

The concentrate was diluted with sufficient water to provide an operating solution having an iron content of 200 ppm. This solution was used successfully for about two weeks in a continuous aerobic operation using a pilot plant scale countercurrent absorption column. The pH of the solution was maintained within the range of from about 8.5 to about 9.5. The gas treated was an off-gas from a xanthate process having a hydrogen sulfide content which varied between about 25 ppm and about 70 ppm. The outlet gas had a hydrogen sulfide content of 5 ppm or less, and the efficiency of hydrogen sulfide removal ranged from about 80% to about 95% dependent upon the hydrogen sulfide content of the feed gas and the pH of the operating solution.

EXAMPLE 2

A laboratory scrubber of the fritted glass disk type was employed to treat an inlet air stream containing 1 to 2% hydrogen sulfide with a chelated iron solution. The solution concentrate was prepared by mixing 10 ml. of 39 wt. % aqueous ferric chloride with 64 g. of "Seqlene ES-40" and 10 g. of Na$_4$EDTA, and then adding 20 g. of 50 wt. % aqueous sodium hydroxide. This concentrate was then diluted with sufficient water to provide 500 g. of solution.

"Seqlene ES-40" is a product of Pfanstiehl Laboratories, Waukegan, Ill., and is a 40% aqueous solution of a reaction mixture containing sodium-α-d-glucoheptonate, sodium-β-d-glucoheptonate, aldobionates and other complex carbohydrates. This mixture has a high content of the salts of the alpha and beta d-glucoheptonates.

Over a period of 24 hours of continuous operation there was substantially complete removal of hydrogen sulfide, and the sulfur was readily recovered from the used solution by filtration. The operation was continued successfully for more than 200 hours with the addition of small amounts of fresh chelated iron solution from time to time as required.

EXAMPLE 3

The procedure of Example 2 was followed using a chelated iron solution prepared from a concentrate of 2.5 ml. of 39 wt. % aqueous ferric chloride, 3.1 g. of sucrose, 4 g. of Na$_4$EDTA, and 5 g. of sodium carbonate, the concentrate being diluted with water to provide 175 g. of solution. Substantially complete removal of hydrogen sulfide was obtained over a continuous operation of 12 days.

EXAMPLE 4

Following the same procedure as in Example 2, substantially complete removal of hydrogen sulfide was obtained using another chelated iron solution. The concentrate was prepared by mixing 2.5 ml. of 39 wt. % aqueous ferric chloride with 16 g. of "Seqlene ES-40", 5.2 g. of "Dequest" 2006, 4 g. of 50 wt. % aqueous sodium hydroxide, and 2 g. of sodium carbonate. This concentrate was diluted with water to provide 175 g. of operating solution.

"Dequest" 2006 is an aqueous solution of the sodium salt of tris-(phosphonomethyl) amine and is a product of Monsanto Company, St. Louis, Mo. "Dequest" 2054, which also can be used as the Type B chelating agent, is an aqueous solution of the sodium salt of N,N,N',N' tetra-(phosphonomethyl) hexamethylenediamine and is also available commercially from the Monsanto Company.

EXAMPLE 5

The procedure of Example 2 was followed in effectively removing hydrogen sulfide with a chelated iron solution prepared from a concentrate comprising 14 ml. of 39 wt. % aqueous ferric chloride, 33.6 g. of Na$_4$EDTA, 13 g. of 70 wt. % aqueous sorbitol, and 14 g. of sodium carbonate. The concentrate was diluted with water to obtain 3785 ml. or 1 gallon of operating solution. It was noted that when hydrogen sulfide without air was introduced, a small amount of ferrous sulfide was formed, but when air was reintroduced along with the hydrogen sulfide, the ferrous sulfide was oxidized and disappeared.

EXAMPLE 6

The concentrate of Example 1 was diluted with sufficient water to provide an operating solution having an iron content of 500 ppm. This operating solution was employed as the catalytic reagent for treating oil field well head gas in a continuous anaerobic operation using a pilot plant unit having separate zones for hydrogen sulfide absorption and for regeneration of the solution. The well head gas was predominantly light hydrocarbons but contained significant amounts (up to 20 vol. %) of carbon dioxide and a varying amount of hydrogen sulfide ranging from less than 0.1 vol. % to 10 vol. %. The experimental run extended for a total on-stream time of 2073 hours over an 87 day period with occasional shut-downs of the equipment for maintenance and other purposes. The pH of the solution ranged from a low of 6 to a high of 9, with the most frequent operation being within the range of pH 7.5 to 8.5.

The efficiency of hydrogen sulfide removal was very high during all periods of normal operation of the unit. During two test periods when the feed gas contained 8.8 vol. % and 5.6 vol. % hydrogen sulfide, the outlet gas had a hydrogen sulfide content of 2 ppm and 1 ppm, respectively. During these periods the pH of the solution was 8.3 and 8.7, respectively. However, good results were also obtained even when the pH was as low as 6.

Sulfur was collected daily by withdrawing a portion of the operating solution from the unit without interrupting the operation, settling the sulfur particles, and then decanting the supernatant liquid and returning it to the process. Used catalyst solution was also withdrawn from the unit on a daily basis for sampling purposes and was replaced with fresh catalyst solution and additional sodium carbonate. The volume of used catalyst solution withdrawn and the volume of fresh catalyst solution added were controlled to insure that the thiosulfate content of the operating solution remained below 15 wt. %. The withdrawn samples of used solution were analyzed for iron content and thiosulfate content. The iron content remained relatively constant throughout the run, and the thiosulfate content increased gradually during the run to a maximum of about 2.7 wt. % during the last few days which was far below the self-imposed maximum of 15 wt. % thiosulfate.

When the foregoing process is continuously carried out over a prolonged period, it has been found advisable to add continuously or periodically an alkaline reagent, such as sodium carbonate, to the process solution to maintain the pH of the solution at the required level. And, in order to prevent the concentration of dissolved salts therein becoming excessive, a portion of the process solution should be withdrawn (i.e. via a blowdown stream) either continuously or periodically. Also, since an appreciable amount of water is lost by evaporation and catalyst is withdrawn from the system by the blowdown stream, fresh water and catalyst should be added to the system from time to time in order to maintain the concentrations of the various components at substantially their initial levels and within the herein described operating ranges.

I claim:

1. A composition for use in an oxidation-reduction process for effecting the catalytic oxidation of hydrogen sulfide gas which comprises a water soluble ferric iron salt and at least two water soluble iron chelating agents with at least one of said iron chelating agents being selected from a group of amine chelating agents consisting of polyamino polycarboxylic acids, polyamino alkyl polycarboxylic acids, polyamino hydroxyalkyl polycarboxylic acids, and poly(phosphonoalkyl) amines, and their alkali metal salts, and at least one other of said iron chelating agents being selected from the group of polyhydroxy chelating agents consisting of monosaccharides, disaccharides, reduced monosaccharides, reduced disaccharides, monosaccharide acids, and disaccharide acids, and their alkali metal salts.

2. A composition as in claim 1, wherein said ferric iron salt and said iron chelating agents are dissolved in an aqueous alkaline solution.

3. A composition as in claim 1 or 2, wherein said amine chelating agent is a mixture of the sodium salts of ethylenediamine tetra-acetic acid and N-hydroxy ethylenediamine tri-acetic acid.

4. A composition as in claim 1 or 2, wherein said amine chelating agent is a poly(phosphonoalkyl) amine.

5. A composition as in claim 1 or 2, wherein said polyhydroxy chelating agent is sorbitol.

6. A composition as in claim 1 or 2, wherein said polyhydroxy chelating agent is mannitol.

7. A composition as in claim 1 or 2, wherein said polyhydroxy chelating agent is a mixture comprising sodium-alpha-d-glucoheptonate and sodium-beta-d-glucoheptonate.

8. A composition as in claim 2, wherein said solution has an iron concentration ranging between about 5 ppm and 5000 ppm.

9. A composition as in claim 2, wherein said amine chelating agent and iron are present in said solution in a molar ratio ranging between about 0.5:1 and 2:1.

10. A composition as in claim 2, wherein said amine chelating agent and iron are present in said solution in a molar ratio of about 9.8:1 and the iron concentration of said solution is between about 5 ppm to 5000 ppm.

11. A composition as in claim 2, wherein said polyhydroxy chelating agent and iron are present in said solution in a molar ratio of at least 0.167:1.

12. A composition as in claim 2, wherein said polyhydroxy chelating agent and iron are present in said solution in a molar ratio of about 0.8:1 and the iron concentration of said solution is between about 5 ppm to 5000 ppm.

13. A composition as in claim 2, wherein said solution has a pH between about pH 8 and about pH 10.5.

14. A method of preparing an alkaline aqueous chelated iron solution for effecting the catalytic oxidation of hydrogen sulfide gas comprising, dissolving a water soluble ferric iron salt in water, adding to said solution at least one amine-type iron chelating agent and at least one polyhydroxy-type iron chelating agent as defined in claim 1, and adding to said solution an alkalizing material.

* * * * *